(12) United States Patent
Iwamoto

(10) Patent No.: US 8,522,953 B2
(45) Date of Patent: Sep. 3, 2013

(54) CONVEYER DEVICE

(75) Inventor: Yuichi Iwamoto, Tokyo (JP)

(73) Assignee: Hirata Corporation, Tokyo (JP)

( * ) Notice: Subject to any disclaimer, the term of this patent is extended or adjusted under 35 U.S.C. 154(b) by 448 days.

(21) Appl. No.: 12/937,602

(22) PCT Filed: Apr. 14, 2008

(86) PCT No.: PCT/JP2008/057257
§ 371 (c)(1),
(2), (4) Date: Oct. 13, 2010

(87) PCT Pub. No.: WO2009/128128
PCT Pub. Date: Oct. 22, 2009

(65) Prior Publication Data
US 2011/0036686 A1    Feb. 17, 2011

(51) Int. Cl.
*B23P 19/00* (2006.01)
(52) U.S. Cl.
USPC .................. 198/345.1; 198/346.3; 29/794
(58) Field of Classification Search
USPC ........... 198/343.1, 345.1, 346, 346.3, 803.14, 198/803.15, 867.11, 867.12; 29/792, 793, 29/794, 822
See application file for complete search history.

(56) References Cited

U.S. PATENT DOCUMENTS

| | | | | |
|---|---|---|---|---|
| 3,955,496 A * | 5/1976 | Urban | | 101/40 |
| 4,205,433 A * | 6/1980 | Araki et al. | | 29/837 |
| 4,385,685 A * | 5/1983 | Sticht | | 198/341.01 |
| 5,060,780 A * | 10/1991 | Santandrea et al. | | 198/345.1 |
| 5,208,969 A * | 5/1993 | Hidese | | 29/740 |
| 5,467,527 A * | 11/1995 | Zanini et al. | | 29/773 |
| 5,562,201 A * | 10/1996 | Kennedy et al. | | 198/841 |
| 5,737,831 A * | 4/1998 | Liechty et al. | | 29/771 |
| 5,855,059 A * | 1/1999 | Togami et al. | | 29/740 |
| 6,293,007 B1 * | 9/2001 | Kuriyama et al. | | 29/840 |
| 6,886,241 B2 * | 5/2005 | Tachibana et al. | | 29/791 |
| 7,278,536 B1 * | 10/2007 | Harrison et al. | | 198/867.09 |
| 7,757,368 B2 * | 7/2010 | Uemura et al. | | 29/450 |

FOREIGN PATENT DOCUMENTS

| | | |
|---|---|---|
| JP | 01-127237 | 5/1989 |
| JP | 2-145230 | 6/1990 |
| JP | 2005/000520 | 1/2005 |
| JP | 2005/056999 | 6/2005 |

OTHER PUBLICATIONS

International Search Report issued May 13, 2008 in International (PCT) Application No. PCT/JP2008/057257.

* cited by examiner

*Primary Examiner* — Douglas Hess
(74) *Attorney, Agent, or Firm* — Wenderoth, Lind & Ponack, L.L.P.

(57) ABSTRACT

A conveyer device conveys a component assembly including a female screw component having a through hole defining a female screw, an assembling component to be assembled to the female screw component from above, and a bolt to be screwed to the female screw of the female screw component from above the assembling component to fix the assembling component. The conveyer device also includes a holding member for holding the female screw component and a screwing restriction mechanism for restricting the bolt, held by the assembling component while unscrewed from the female screw, from being screwed to the female screw. Thus, when the component assembly, to which the bolt is temporarily assembled without being engaged with the female screw, is conveyed while being held by the holding member via the female screw component, the bolt is prevented from being unintentionally screwed into the female screw as the result of vibration etc. caused by the conveyance.

8 Claims, 14 Drawing Sheets

CONVEYER DEVICE

TECHNICAL FIELD

The present invention relates to a conveyer device that conveys a component assembly including at least two components which are coupled with each other by using a bolt, and more particularly to a conveyer device that is applied to an assembling line for assembling components while conveying component assemblies such as a connecting rod and a piston utilized for an internal-combustion engine.

BACKGROUND ART

As an automatic assembling line for automatically assembling a piston ring to a piston for an internal-combustion engine, there is known one that includes a frame, a guide rail provided to extend in a horizontal direction above the frame, a conveyer device that is guided along the guide rail, and others and that has a configuration where a plurality of pairs of holding arms for holding from a lower side a large-end portion of a connecting rod connected with a piston are aligned at predetermined intervals in order to horizontally convey the piston which is in a downwardly suspended state in this conveyer device (see, e.g., Patent Document 1 and Patent Document 2).

On the other hand, the connecting rod applied to the internal-combustion engine includes a small-end portion for connecting a piston, a large-end portion to be connected to a crankshaft, and a rod portion for coupling the small-end portion with the large-end portion, and the large-end portion is divided into two pieces, i.e., a rod-side component including the small-end portion and the rod portion and a cap component and configured to be fastened by a bolt.

Meanwhile, to convey a component assembly including the connecting rod and the piston to a bearing assembling station by using the conveyer device in the automatic assembling line and assemble a bearing for supporting the crankshaft to the large-end portion of the connecting rod, the cap component fastened by the bolt must be separated from the rod-side component in advance.

Therefore, a bolt utilized to fasten the cap component to the rod-side component is first loosened in a bolt loosening station on an upstream side, and then the cap component must be separated from the rod-side component together with the bolt in a cap component separating station on a downstream side.

However, in a state where the loosened bolt is inserted and held in an insertion hole of the cap component, when carrying the component assembly from the bolt loosening station on the upstream side to the cap component separating station on the downstream side, rescrewing that the once loosened bolt is unintentionally meshed with a female screw of the rod-side component (the bolt inserted and held in the cap component is again screwed into the female screw of the rod-side component) may occur due to vibration and others during conveyance.

When the rescrewing occurs in this manner, the cap component cannot be separated from the rod-side component in the cap component separating station on the downstream side, and the bearing cannot be assembled in the bearing assembling station placed on the downstream side.

Patent Document 1: Pamphlet of International Publication No. WO2005/000520A1
Patent Document 2: Pamphlet of International Publication No. WO2005/056999A1

DISCLOSURE OF INVENTION

Problem to be Solved by the Invention

In view of the above-described problem in the conventional art, it is an object of the present invention to provide a conveyer device that can achieve simplification of a configuration, a reduction in size of the device, and others and that can prevent a loosened and temporarily assembled bolt from being unintentionally screwed into a female screw due to an influence of vibration and others during conveyance when carrying a component assembly including at least two components which are fastened by using a bolt.

Means for Solving Problem

A conveyer device according to the present invention that achieves the object is a conveyer device for conveying a component assembly that includes a female screw component having a through hole defining a female screw, an assembling component to be assembled to the female screw component from above, and a bolt to be screwed into the female screw of the female screw component from above the assembling component to enable fixing the assembling component. The conveyer device includes a holding member that holds the female screw component, and a screw restriction mechanism that is provided to the holding member to restrict the bolt held by the assembled member in a state where the bolt is unscrewed from the female screw so as not to be screwed into the female screw.

According to this configuration, when the component assembly in which the assembling component is assembled to the female screw component from above and the bolt is temporarily assembled to the assembling component from above while unscrewed from the female screw is held by the holding member through the female screw component and conveyed, even if the bolt is unintentionally rotated to be screwed into the female screw under the influence of vibration and others due to conveyance, the screwing restriction mechanism restricts screwing of the bolt, whereby the bolt is maintained in a state where screwing with respect to the female screw is canceled.

Therefore, the component assembly can be conveyed by using this conveyer device, the assembling component can be readily separated from the female screw component in a processing station on the downstream side, and predetermined processing can be performed with respect to the female screw component or the assembling component.

In the above-described configuration, it is possible to adopt a configuration that the screwing restriction mechanism includes a contact pin that is inserted into the through hole from below and comes into contact with a lower end portion of the bolt, and an urging member that is provided to the holding member to upwardly urge the contact pin.

According to this configuration, the contact pin comes into contact with the lower end portion of the bolt, and the contact pin is urged to push up the bolt by the urging member.

Therefore, when conveying the component assembly having the bolt unscrewed from the female screw, the contact pint, which is urged by the urging member, can be utilized to push up and hold the bolt at a high position apart from the female screw so that the bolt can be prevented from moving down to be screwed into the female screw.

On the other hand, when conveying the component assembly having the bolt screwed in the female screw, the contact pin is pushed down by the lower end portion of the bolt against the urging force of the urging member, whereby the component assembly can be conveyed without problem.

Adopting the contact pin and the urging member as the screwing restriction mechanism in this manner enables simplifying the construction.

In the above-described configuration, it is possible to adopt a configuration that the female screw component has a connected component that is connected in a state where the female screw component is held by the holding member while being suspended, and the conveyer device further includes a grasping mechanism that grasps the connected component.

According to this configuration, when conveying the component assembly (the female screw component, the connected component, the assembling component) having the bolt unscrewed from the female screw, the connected component can be grasped by the grasping mechanism to avoid vibration or pendular-like oscillation thereof, whereby screwing of the bolt due to vibration or oscillation of the connected component can be prevented even if the screwing restriction mechanism cannot operate.

In the above-described configuration, it is possible to adopt a configuration that the holding member has a guide hole into which the contact pin is inserted to be guided, and the urging member is a cantilever-like spring that holds the contact pin inserted in the guide hole at a free end portion thereof and has a fixed end portion fixed to the holding member.

According to this configuration, the contact pin can be assuredly brought into contact with the lower end portion of the bolt while avoiding displacement since the contact pin moves up and down along the guide hole of the holding member, and the fixed end portion of the urging member can be easily fixed to the holding member since the urging member is the cantilever-like spring. Therefore, the urging member (the cantilever-like spring) can be readily attached to a holding member of an existing conveyer device including no screwing restriction mechanism.

In the above-described configuration, it is possible to adopt a configuration that the holding member has a guide hole into which the contact pin is inserted to be guided, and the urging member is a compression type coil spring that holds the contact pin inserted in the guide hole at one end portion thereof and has the other end portion held by the holding member.

According to this configuration, the contact pin can be assuredly brought into contact with the lower end portion of the bolt while avoiding displacement since the contact pin moves up and down along the guide hole of the holding member, and the urging member (the coil spring) can be accommodated and held without being exposed to the outside of the holding member since the urging member is a coil spring. Therefore, the construction can be smoothed so as to prevent the various components from protruding around the holding member.

In the above-described configuration, it is possible to adopt a configuration that the female screw component is a rod-side component including a small-end portion, a rod portion, and a half-large-end portion that defines a half of a large-end portion which are parts of a connecting rod used for an internal-combustion engine, the assembling component is a cap component assembled to the rod-side component by using two bolts so as to define the other half of the large-end portion, the holding member includes a holding arm that holds the rod-side component, and the screwing restriction mechanism is provided to the holding arm.

According to this configuration, the connecting rod is applied as the component assembly, the rod-side component is held by the holding arm, the cap component is assembled to (the half-large-end portion of) the rod-side component from above, the bolts are temporarily assembled without screwing into the female screw, and the component assembly is conveyed. At the time of conveyance, even if the bolt unintentionally rotates to be screwed into the female screw under the influence of vibration and others due to conveyance, the screwing restriction mechanism restricts screwing of the bolt, whereby the bolt is maintained in a state where being unscrewed from the female screw.

Therefore, the connecting rod (having the piston as the connected component connected to the small-end portion) can be conveyed by using this conveyer device, the cap component can be readily separated (together with the bolt) from the rod-side component in the cap component separating station on the downstream side, and the semicircular bearing that supports the crankshaft can be attached to each of the rod-side component and the cap component.

In the above-described configuration, it is possible to adopt a configuration that the screwing restriction mechanism includes two contact pins that are respectively inserted into two through holes of the rod-side component from below and respectively come into contact with lower end portions of the two bolts, and urging members that are provided to the holding member to upwardly urge the two contact pins respectively, the holding arm has two guide holes into which the two contact pins are inserted to be guided respectively, and each of the urging members is a cantilever-like spring that is arranged below the holding arm, holds each of the two contact pins inserted in the guide holes at a free end portion thereof, and has a fixed end portion fixed to the holding member.

According to this configuration, since the screwing restriction mechanism that includes the contact pin and the cantilever-like spring is provided so as to correspond to each of the two bolts, each contact pin and each cantilever-like spring can prevent each bolt from being screwed into the female screw when conveying the component assembly having the two bolts unscrewed from the female screws.

On the other hand, when conveying the component assembly having the two bolts screwed to the female screws, since each contact pin is pushed down by the lower end of the bolt against the urging force of each cantilever-like spring, the component assembly can be conveyed without problem.

In the above-described configuration, it is possible to adopt a configuration that the holding member includes a component mount portion that is arranged to be adjacent to the holding arm in order to hold the assembling component separated from the female screw component.

According to this configuration, when the assembling component is separated from the female component, the separated assembling component can be mounted on the component mount portion to be held, and the female component and the assembling component can be conveyed at the same time in the separated state.

Advantageous Effect of the Invention

According to the conveyer device having the above-described configuration, simplification of the construction, a reduction in size of the device, and others can be achieved, the unscrewed and temporarily assembled bolt can be prevented from being unintentionally screwed into the female screw under the influence of vibration and others during conveyance at the time of conveying the component assembly including at least two components which are fastened by using the bolt, especially, the connecting rod having the piston connected to the small-end portion thereof can be conveyed in the suspended state, the cap component together with the bolt can be easily separated from the rod-side component in the cap component separating station on the downstream side, and the semicircular bearing that supports the crankshaft can be smoothly assembled to each of the rod-side component and the cap component in the bearing assembling station.

EXPLANATIONS OF LETTERS OR NUMERALS

Figure 1:
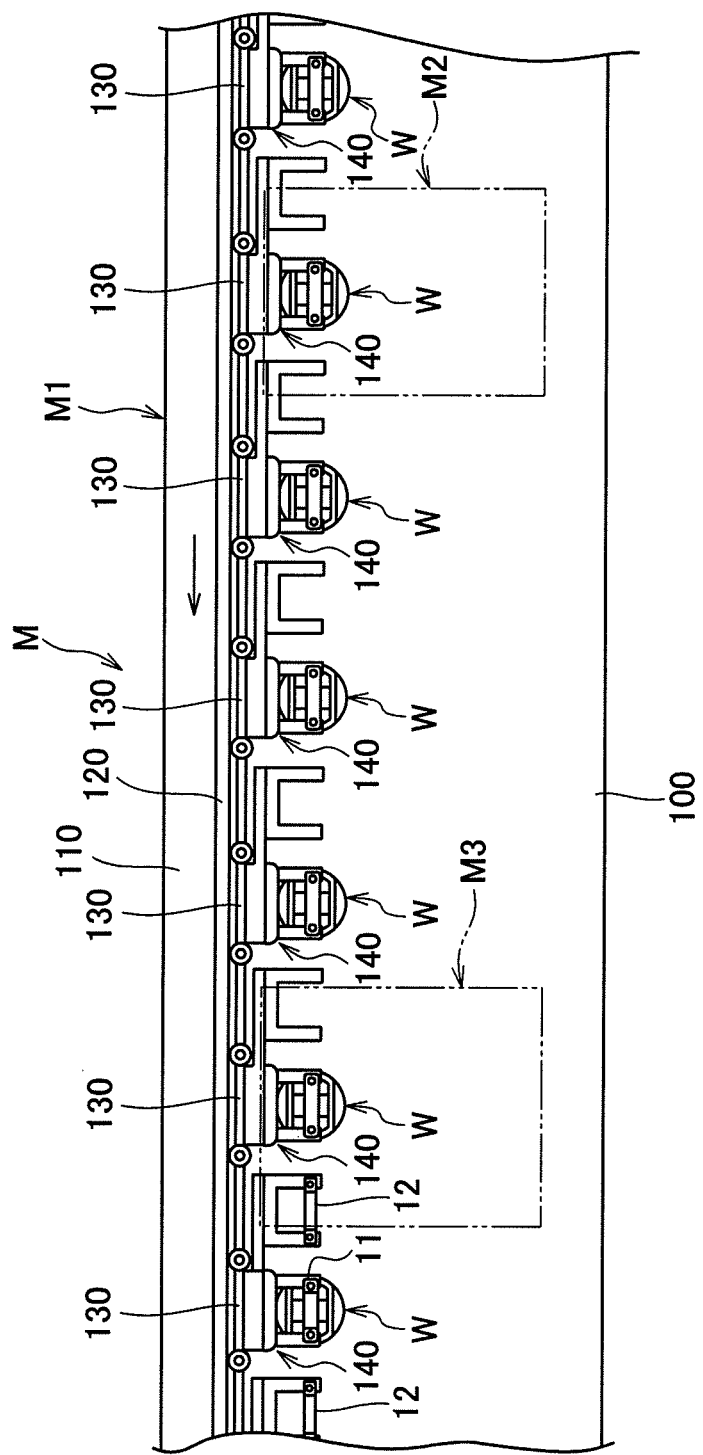
FIG. 1 is a plan view showing an embodiment of a conveyer device according to the present invention.

W component assembly
CR connecting rod
11 rod-side component (a female screw component)
11$a$ small-end portion
11$b$ rod portion
11$c$ half-large-end portion (one half of a large-end portion)
11$d$ through hole
11$d'$ female screw
11$e$ joining surface
11$f$ end face
11$g$ fitting surface
12 cap component (an assembling component, the other half of the large-end portion)
12$a$ insertion hole
12$b$ joining surface
12$c$ end face
12$d$ fitting surface
13 bolt
13$a$ male screw
13$b$ reduced diameter portion
13$c$ head portion
13$d$ retaining ring
P piston (a connected component)
BR bearing
M automatic assembling line
M1 conveyer device
M2 bolt loosening station
M3 cap component separating station
100 base
110 upright frame
120 guide rail
130 traveling plate
131 roller
140, 140' holding member
141 basal portion
141$a$ through hole
141$b$ support portion
142, 142' holding arm
142$a$ holding concave portion
142$b$ protrusion
142$c$ guide hole
142$d$ end face
142$e$ space portion
143 bolt
144 component mount portion
144$a$ holding concave portion
144$b$ protrusion
145 bolt
150, 150' screwing restriction mechanism
151 contact pin
151$a$ flange portion
152 cantilever-like spring (an urging member)
152$a$ free end portion
152$b$ fixed end portion
152' coil spring (an urging member)
160 grasping mechanism
161 interlocking rod
161$a$ flange portion
161$b$ pin
162 grasping arm
162$a$ spindle
162$b$ one end portion
162$c$ other end portion
162$d$ concave portion
162$e$ grasping piece
162$f$ driven pin
163 coil spring
164 actuator
164$a$ driving rod
164$b$ driving piece

BEST MODE(S) FOR CARRYING OUT THE INVENTION

The best mode for carrying out the present invention will now be described hereinafter with reference to the accompanying drawings.

This conveyer device M1 is to convey a component assembly W, and, as shown in FIG. 1, constitutes an automatic assembling line M together with a transferring station (not shown) for a component assembly M, a bolt loosening station M2, a cap component separating station M3, and a bearing assembling station (not shown).

In this automatic assembling line M, as shown in FIG. 1, the transferring station (not shown), the bolt loosening station M2, the cap component separating station M3, and the bearing assembling station (not shown) are aligned from an upstream side toward a downstream side in the mentioned order along a conveying direction of the conveyer device M1.

Figure 3:
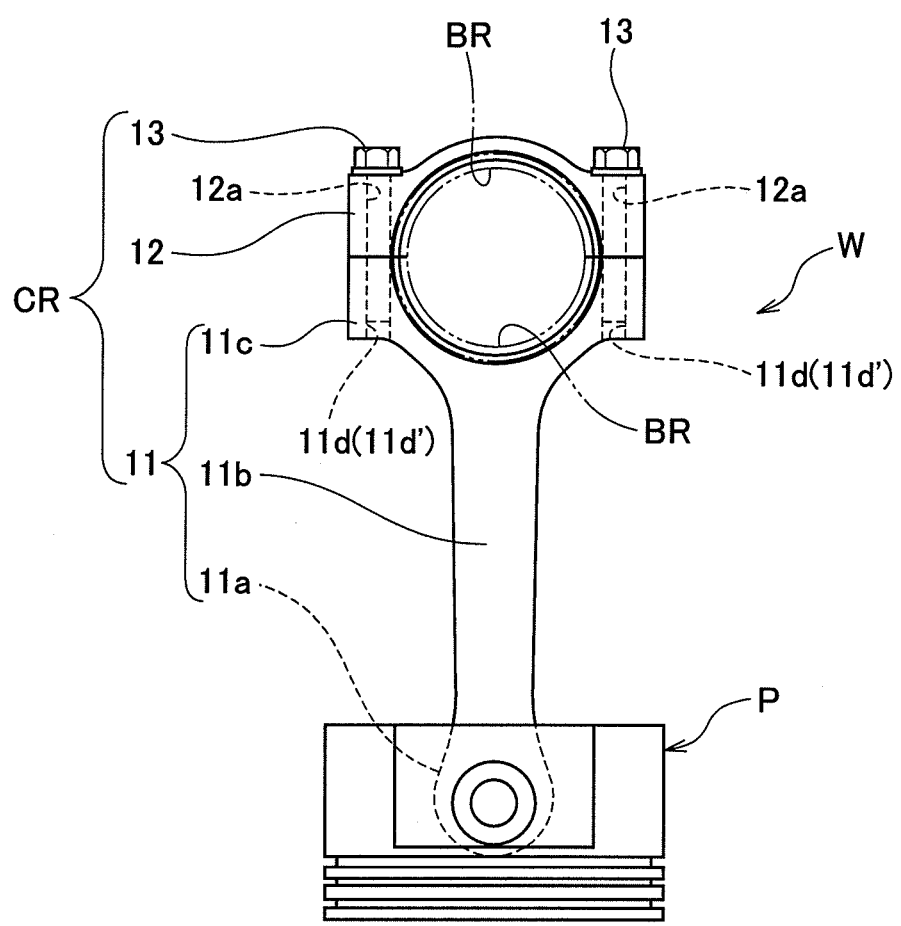
FIG. 3 is a front view showing a component assembly (a connecting rod having a piston connected thereto) conveyed by the conveyer device according to the present invention.

Here, as shown in FIG. 3, the component assembly W conveyed by the conveyer device M1 is a connecting rod CR connected with a piston P as a connected component used in an internal-combustion engine, and is conveyed in a suspended state where the piston P connected to a small-end portion 11a faces downward.

Figure 4:
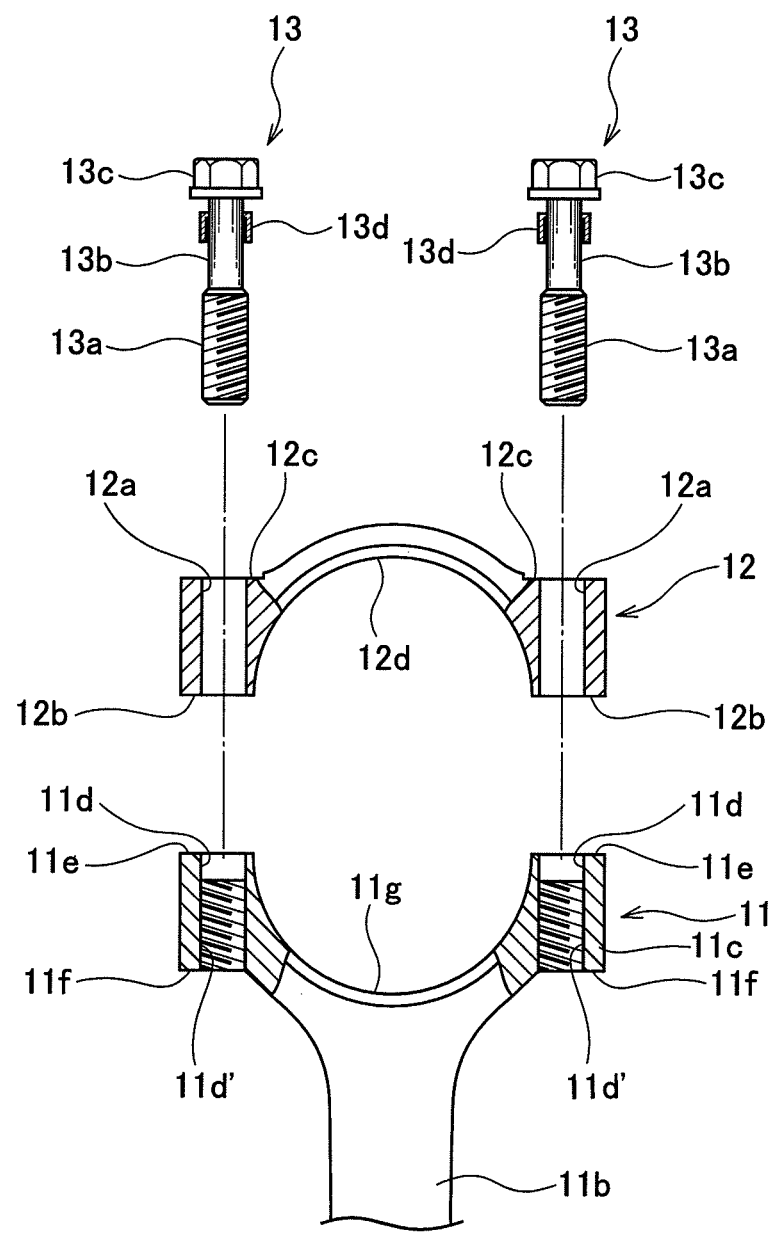
FIG. 4 is an exploded view showing that a connecting rod constituting the component assembly is exploded to a rod-side component, a cap component, and bolts.

As shown in FIG. 3 and FIG. 4, the connecting rod CR is constituted of: a rod-side component 11 as a female screw component including a small-end portion 11a for connecting the piston P, a rod portion 11b, and a half-large-end portion 11c that defines a half of a large-end portion to which a bearing BR supporting a crankshaft is attached; a cap component 12 as an assembling component that defines the other half of the large-end portion; and two bolts 13 that fix the cap component 12 to the rod-side component 11.

As shown in FIG. 4, in the half-large-end portion 11c, the rod-side component 11 includes through holes 11d each of which defines a female screw 11d', joining surfaces 11e to which the cap component 12 is joined, end faces 11f held by a holding arm 142 of a later-described holding member 140, a fitting surface 11g to which a semicircular bearing BR is fitted, and others.

The female screw 11d' has a screw thread which protrudes from an inner peripheral surface of the through hole 11d inwardly in a radial direction and is formed to be partially biased to the end face 11f in a predetermined range along an axial direction of the through hole 11d.

As shown in FIG. 4, the cap component 12 includes insertion holes 12a each of which is formed with an inside diameter that enables insertion of a male screw 13a and a reduced diameter portion 13b of the bolt 13, joining surfaces 12b each of which is joined to each joining surface 11e of the half-large-end portion 11c, end faces 12c each of which comes into contact with a head portion 13c of the bolt 13, and a fitting surface 12d in which the semicircular bearing BR is fitted.

As shown in FIG. 4, the bolt 13 includes the male screw 13a that can be screwed into the female screw 11d of the rod-side component 11, the cylindrical reduced diameter portion 13b having a diameter smaller than that of the male screw 13a, the head portion 13c having a flange, a retaining ring 13d that has a smaller inside diameter than an outside diameter of the male screw 13a, is movably fitted on the reduced diameter portion 13b, and fitted in the insertion hole 12a of the cap portion 12 so as not to fall off, and others.

The retaining ring 13d restricts falling of the bolt 13 from (the insertion hole 12a of) the cap component 12 even in a state that the male screw 13a of the bolt 13 is unscrewed from the female screw 11d'.

Further, the cap component 12 is assembled to the rod-side component 11 from above and the bolts 13 are assembled to the cap component 12 from above in the component assembly W in a state where the piston P is connected to the small-end portion 11a of the connecting rod CR and the piston P is downwardly suspended, and the component assembly W is conveyed by the conveyer device M1 in a state where the bolts 13 are screwed in the female screws 11d' of the rod-side component 11 or in a state where the bolts 13 are unscrewed from the female screws 11d' of the rod-side component 11 and held by the cap component 12.

Figure 2:
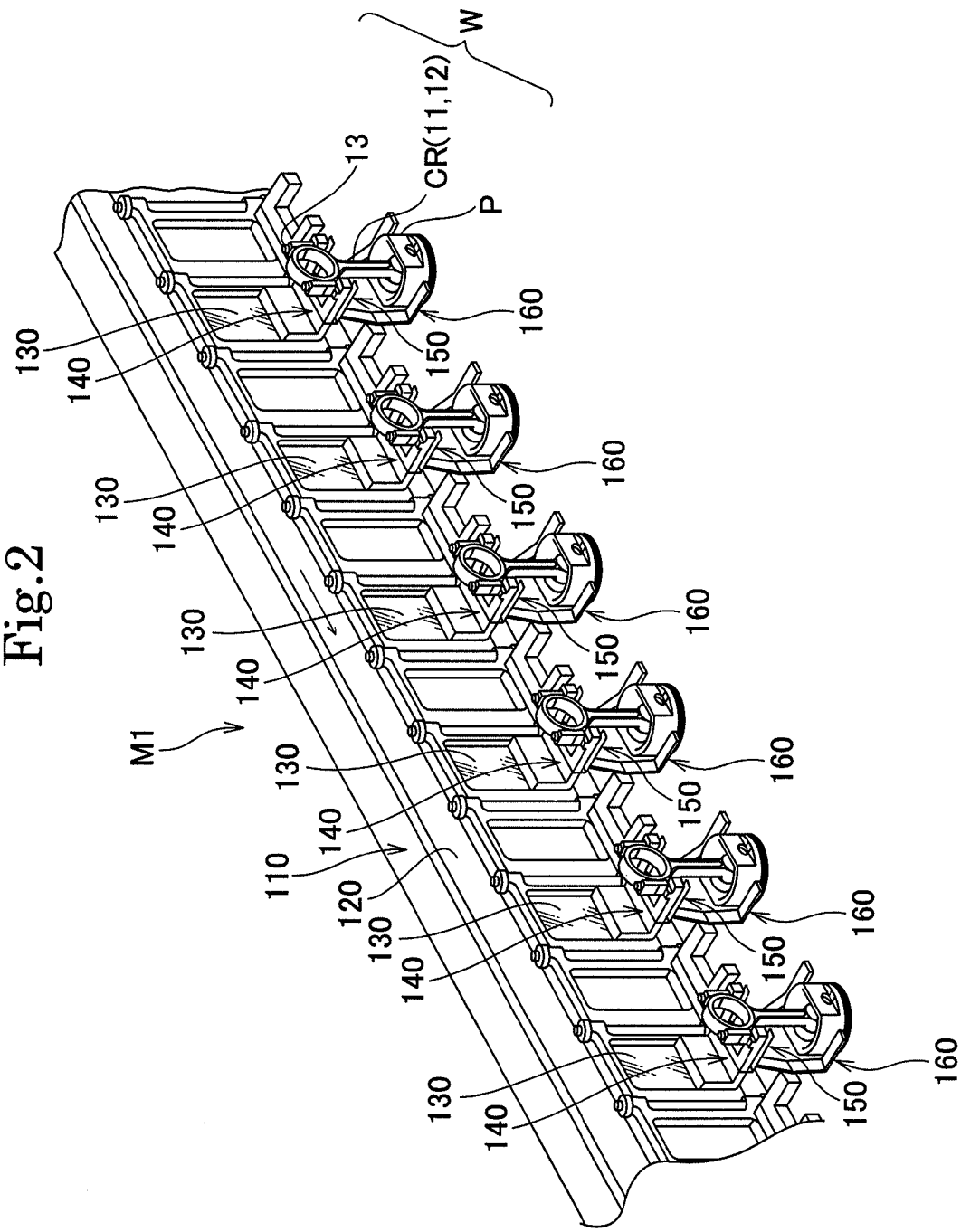
FIG. 2 is a partial perspective view showing a part of the conveyer device according to the present invention.
Figure 5:
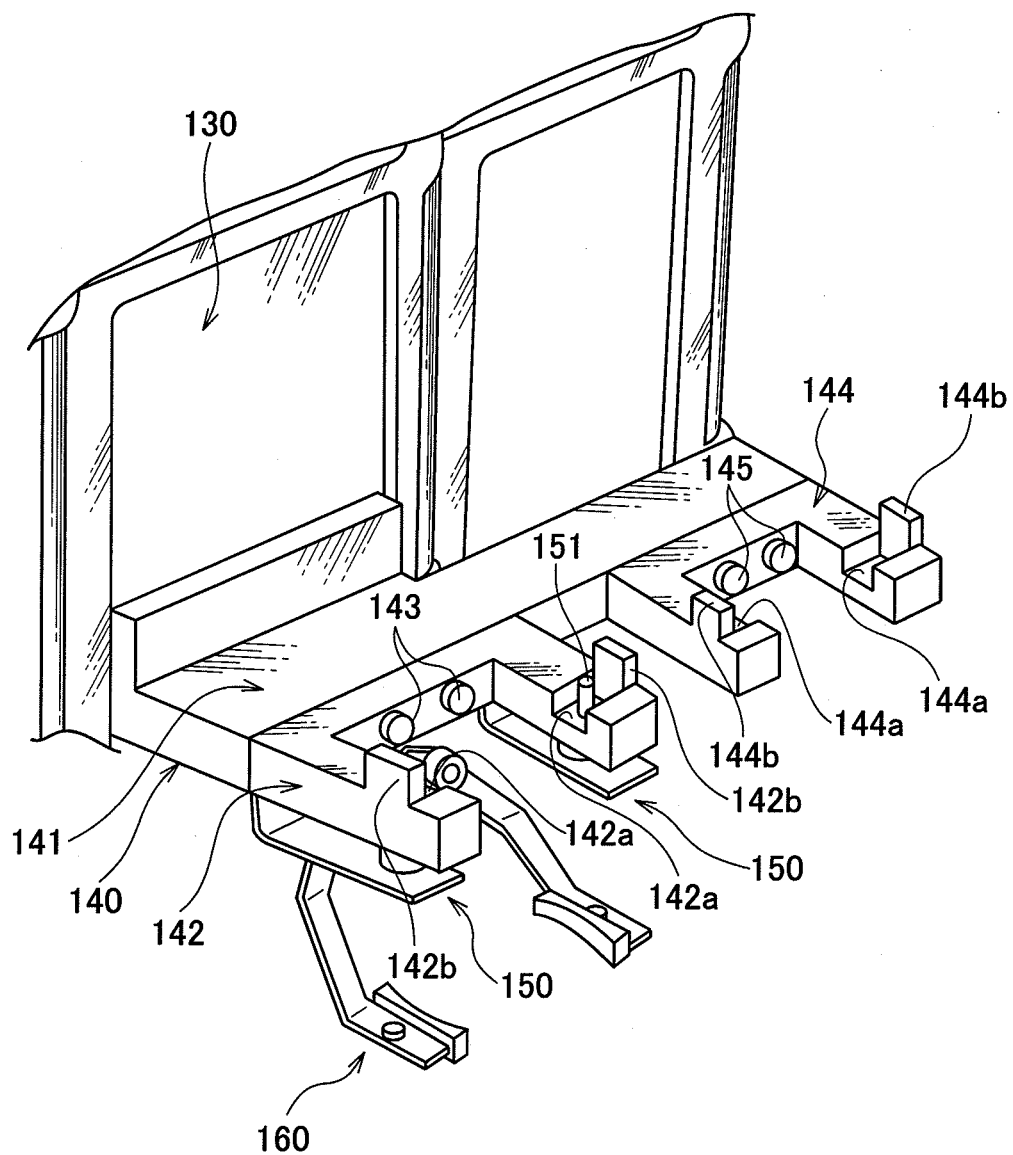
FIG. 5 is a partial perspective view showing a holding member (holding arms, a component mount portion), a screwing restriction mechanism, and a grasping mechanism included in the conveyer device depicted in FIG. 2.

As shown in FIG. 1, FIG. 2, and FIG. 5, the conveyer device M1 includes a base 100, an upright frame 110 provided on the base 100, a guide rail 120 provided to the upright frame 110 and extended in a conveying direction, a plurality of traveling plates 130 that travel along the guide rail 120 in the horizontal direction, holding members 140 provided to the respective traveling plates 130, screwing restriction mechanisms 150 provided to the respective holding members 140, grasping mechanisms 160 provided to the respective holding members 150 (partially provided to the upright frame 110), and others.

Figure 7:
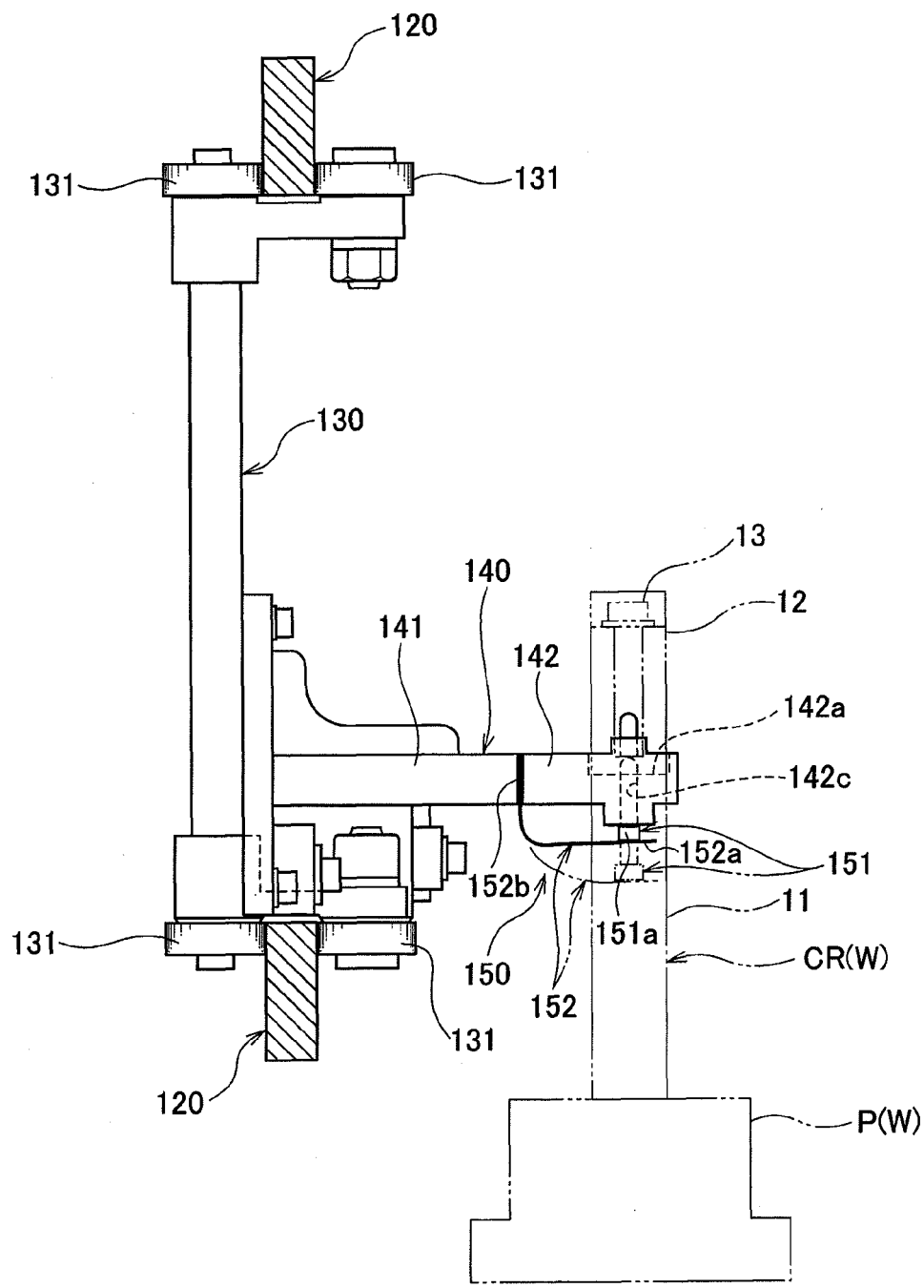
FIG. 7 is a side view showing the holding member (the holding arm) and a screwing restriction mechanism included in the conveyer device depicted in FIG. 2.

As shown in FIG. 2, FIG. 5, and FIG. 7, the plurality of traveling plates 130 are connected to each other along the guide rail 120 and include rollers 131 that roll along the guide rail 120 and others. Further, the holding member 140 is fixed to a front surface of each traveling plate 130, and the screwing restriction mechanism 150 and the grasping mechanism 160 are provided to the holding member 140.

Figure 6A:
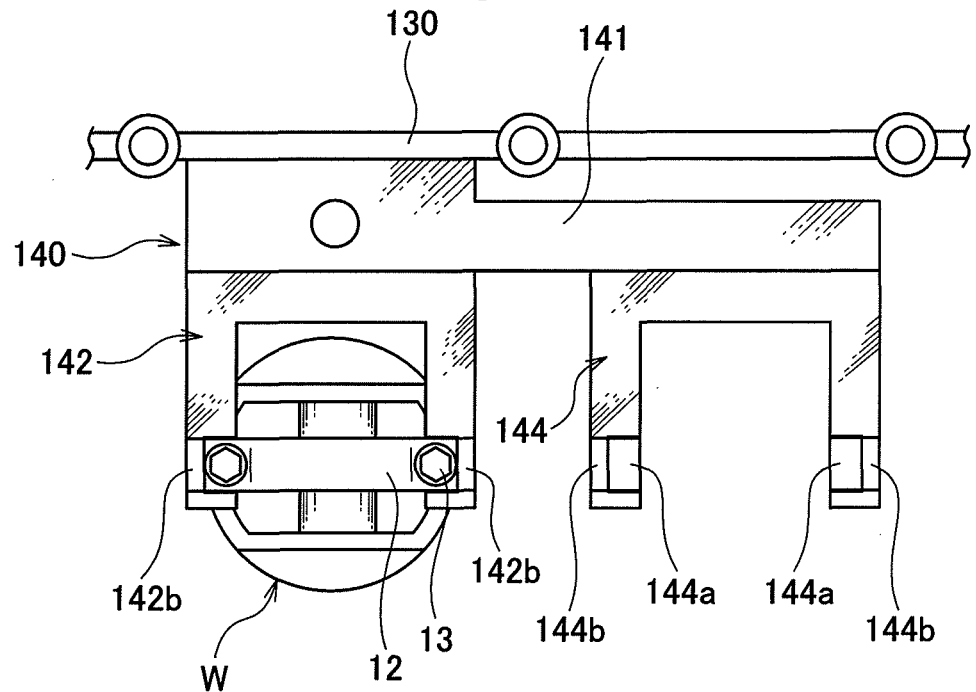
FIG. 6A is a plan view showing a state where a component assembly (a female screw component, a connected component, an assembling component) is held by the holding arms in the holding member (the holding arms, the component mount portion) depicted in FIG. 5.
Figure 6B:
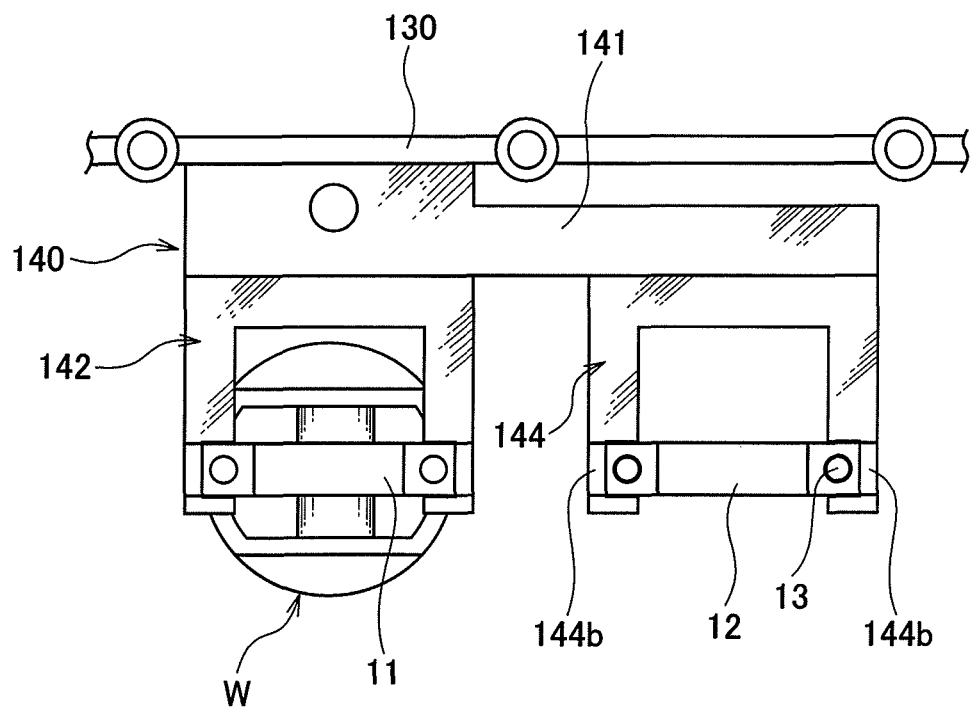
FIG. 6B is a plan view showing a state where a female screw component having the connected component connected thereto is held by the holding arms and the separated assembling component is mounted on the component mount portion in the holding member (the holding arms, the component mount portion) depicted in FIG. 5.

As shown in FIG. 5, FIG. 6A, and FIG. 6B, the holding member 140 includes a basal portion 141 fixed to the traveling plate 130, a substantially-U-like holding arm 142 connected to the basal portion 141 by using bolts 143, a substantially-U-like component mount portion 144 that is arranged to be adjacent to the holding arm 142 and connected to the basal portion 14 by using bolts 145, and others.

Figure 11:
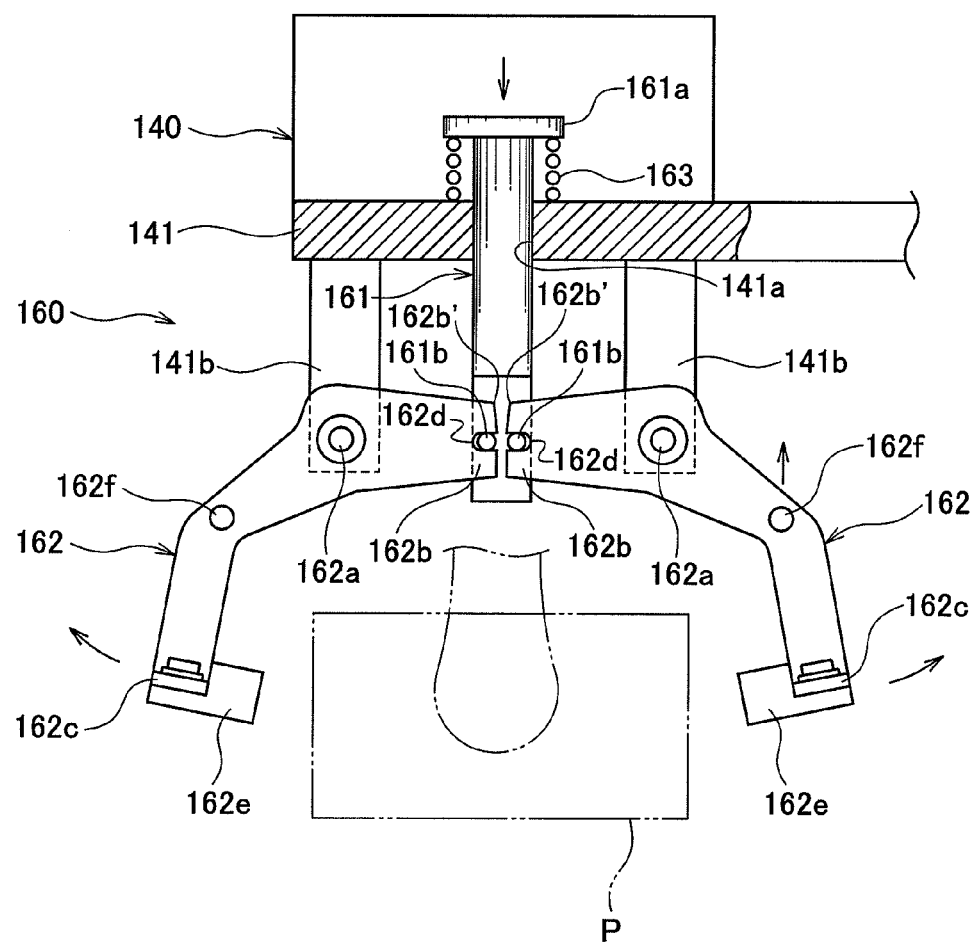
FIG. 11 is a front view showing a grasping mechanism included in the conveyer device depicted in FIG. 2.
Figure 12:
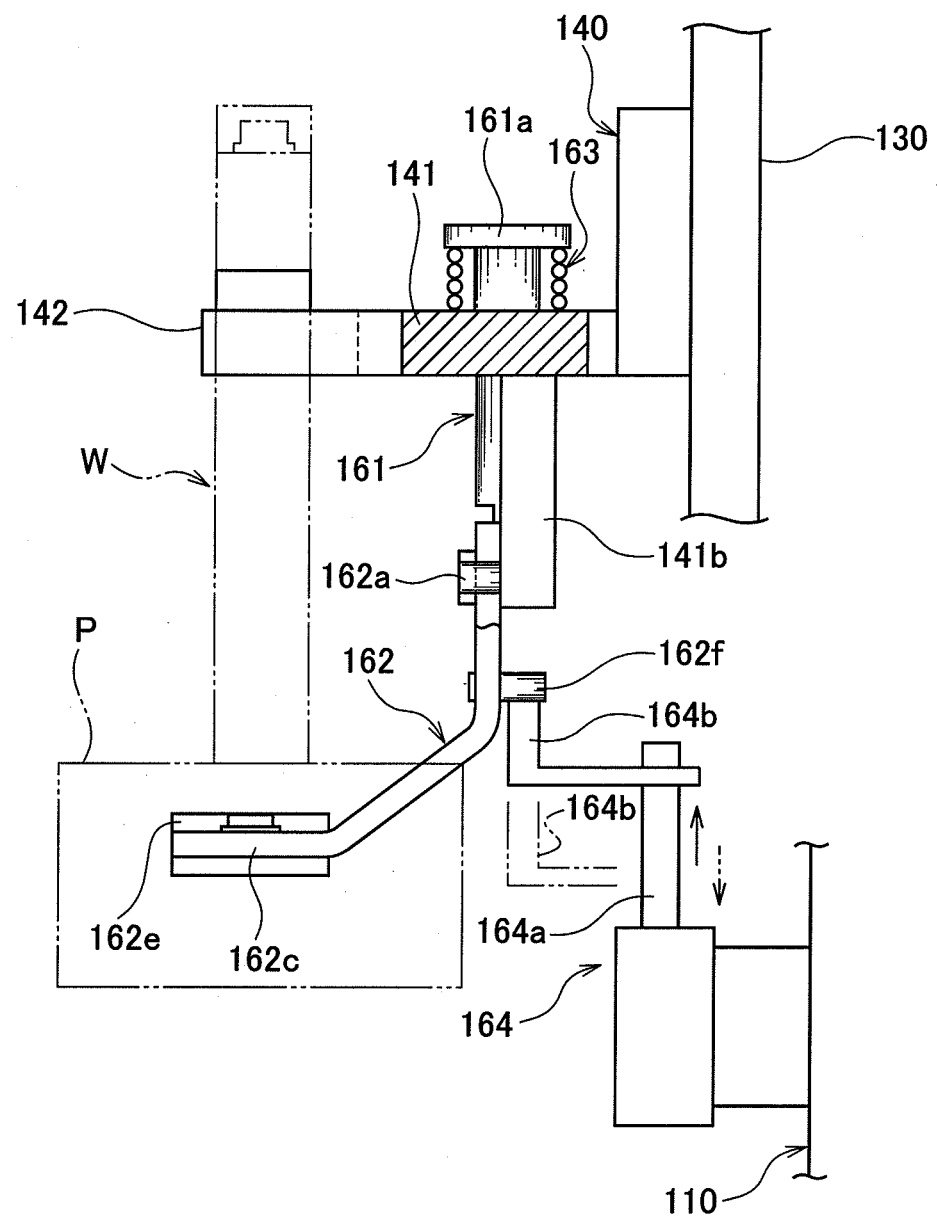
FIG. 12 is a side view showing the grasping mechanism included in the conveyer device depicted in FIG. 2.
Figure 13:
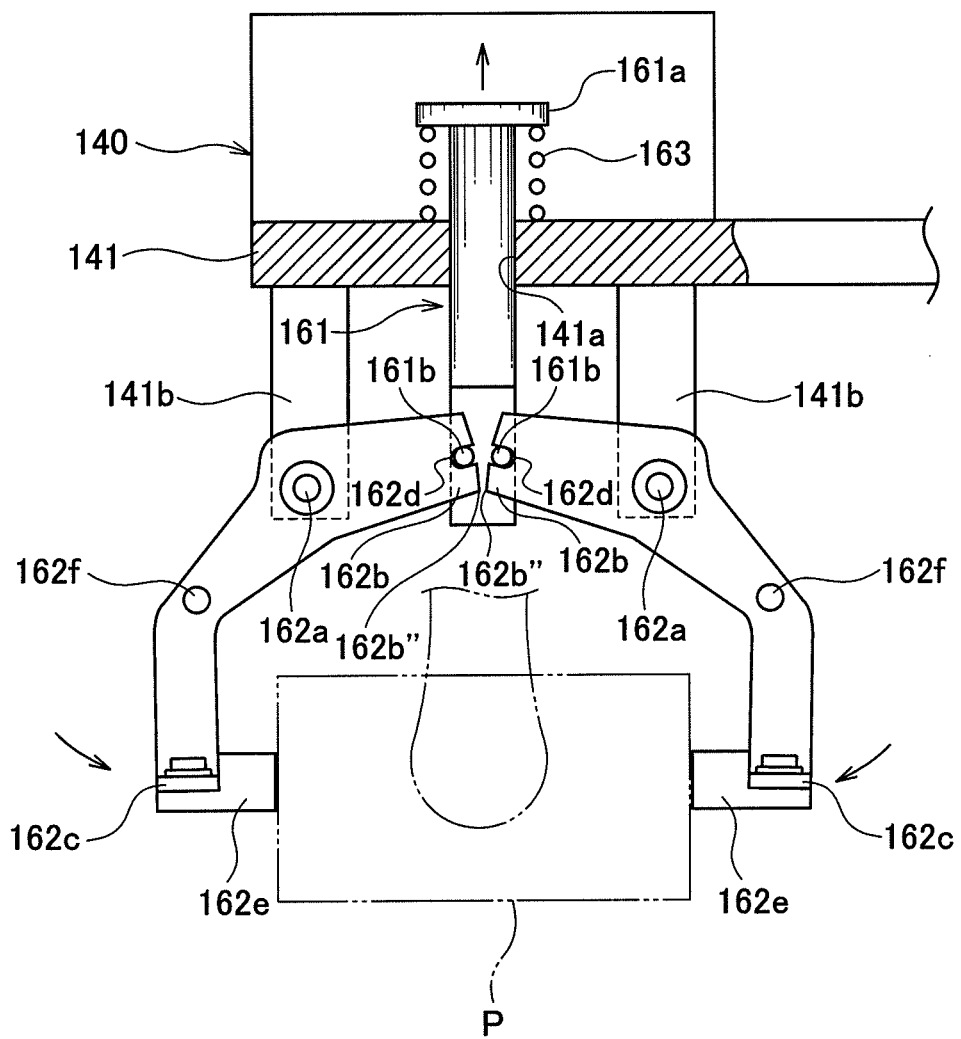
FIG. 13 is a side view showing the grasping mechanism included in the conveyer device depicted in FIG. 2.

The basal portion 141 is fixed to the traveling plate 130 by using bolts, and as shown in FIG. 11 to FIG. 13, the basal portion includes a circular through hole 141a through which an interlocking rod 161 of the grasping mechanism 160 is inserted so as to allow upward and downward movements, a support portion 141b downwardly extended to swingably support two grasping arms 162 of the grasping mechanism 160, and others.

Figure 8A:
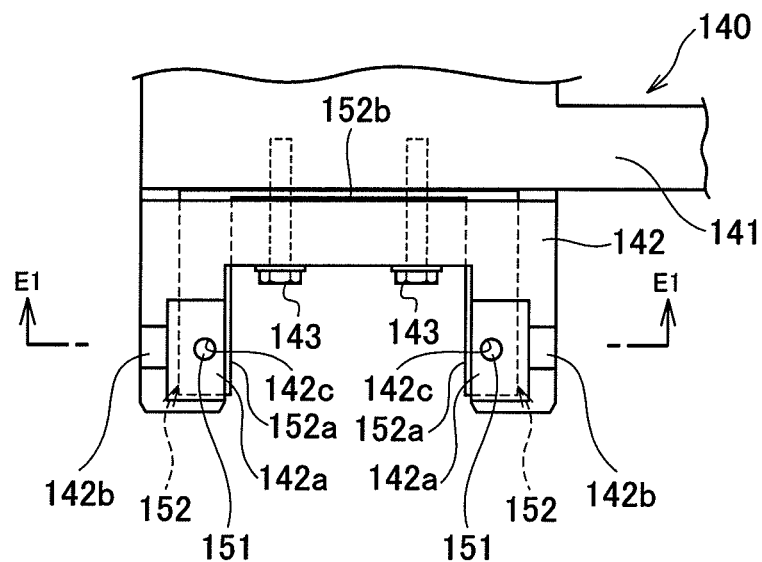
FIG. 8A is a partial plan view showing the holding component (the holding arm) and the screwing restriction mechanism included in the conveyer device depicted in FIG. 7.
Figure 8B:
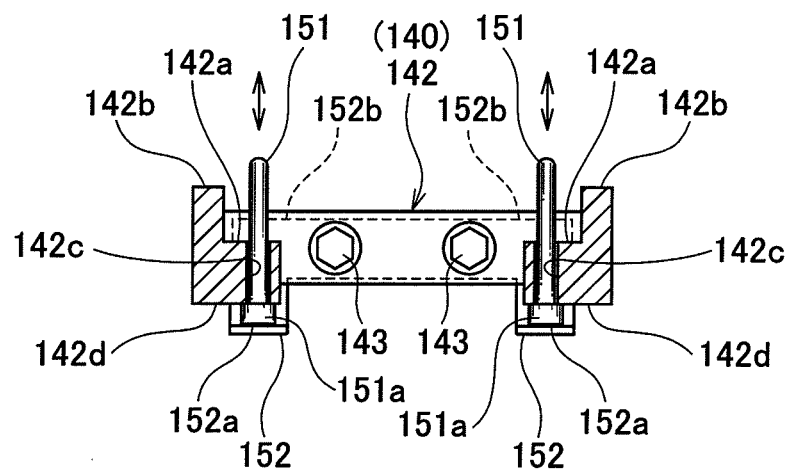
FIG. 8B is a cross-sectional view taken along a line E1-E1 in FIG. 8A.

As shown in FIG. 5, FIG. 8A, and FIG. 8B, the holding arm 142 includes a holding concave portion 142a that holds (the end faces 11f of) the half-large-end portion 11 of the connecting rod CR, two protrusions 142b that position (both side surfaces of) the half-large-end portion 11c, two guide holes 142c through which contact pins 151 of the screwing restriction mechanism 150 are inserted to be guided, end faces 142d with which flange portions 151a of the contact pins 151 are brought into contact to restrict upward movement, and others.

As shown in FIG. 5, FIG. 6A, and FIG. 6B, the component mount portion 144 is to mount thereon and hold the cap component 12 separated from the rod-side-component 11, and the component mount portion includes holding concave portions 144a that hold the cap component 12 in an inverted state, two protrusions 144b that position the cap component 12, and others.

Here, the holding arm 142 and the component mount portion 144 having various shapes according to types of the connecting rod CR are prepared, and the holding arm and the component mount portion can be replaced in accordance with a change in type of the connecting rod CR by loosening the bolts 143 and 145 to remove these members from the basal portion 141.

Further, the holding arm 142 is fixed to the basal portion 141 so as to sandwich a fixed end portion 152b of a cantilever-like spring 152 of the screwing restriction mechanism 150 therebetween.

Here, the holding arms 142 are provided with the guide holes 142c through which the contact pins 151 of the screwing restriction mechanism 150 are inserted to be guided. Therefore, displacement of the contact pins 151 can be avoided, and the contact pins 151 can be assuredly brought into contact with the lower end portions of the bolts 13.

Furthermore, since the holding member 140 includes the component mount portion 144 that is adjacent to the holding arm 142, the separated cap portion 12 can be mounted onto and held by the component mount portion 144 when the cap component 12 is separated from the rod-side component 11, and then the rod-side component 11 and the cap component 12 can be conveyed together in a separated state.

As shown in FIG. 7, FIG. 8A, and FIG. 8B, the screwing restriction mechanism 150 includes the two contact pins 151 inserted into the two guide holes 142c of the holding arm 142, respectively, cantilever-liked springs 152 as an urging member that urge the contact pins 151 upwards, and others.

As shown in FIG. 7, FIG. 8A, and FIG. 8B, the flange portion 151a placed at a lower end of each contact pin 151 is secured and held to a free end portion 152a of the cantilever-like spring 152, and each contact pin 151 is inserted into each guide hole 142c of the holding arm 142 and guided to allow its upward and downward movements and also inserted into each through hole 11d of the rod-side member 11 from below so that the contact pin can come into contact with the lower end portion of each bolt 13.

As shown in FIG. 7, FIG. 8A, and FIG. 8B, the cantilever-like spring 152 is formed so as to define the free end portion 152a that holds the contact pin 151 and the fixed end portion 152b fixed to the holding member 140. That is, the cantilever-like spring 152 is formed as one component integrally including the two free end portions 152a and the fixed end portion 152b by bending a leaf spring into a substantially-L-like shape.

Moreover, the cantilever-like spring 152 holds the contact pin 151 at the free end portions 152a, and is fixed to the holding member 140 in such a manner that the fixed end portion 152b is sandwiched between the basal portion 141 and the holding arm 142 to be fastened by the bolts 143.

Since the cantilever-like spring 152 as one component including the two free end portions 142a is adopted as the urging member in this manner, an increase in number of components can be suppressed, whereby the construction can be simplified and facilitation of an assembling operation for assembling the screwing restriction mechanism 150 to the holding member 142 and simplification of the number of assembling steps can be achieved.

Figure 9:
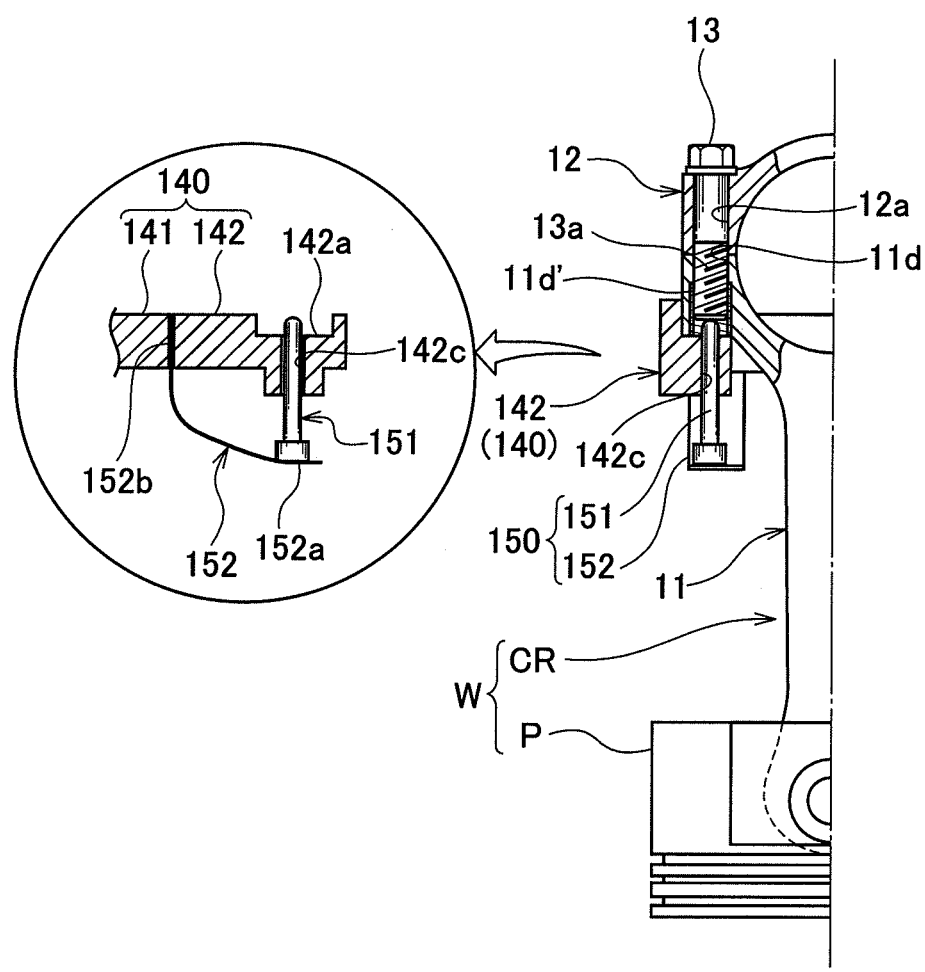
FIG. 9 is a partial cross-sectional view for explaining an operation of the screwing restriction mechanism depicted in FIG. 7.

Additionally, as shown in FIG. 9, when the component assembly W (the connecting rod CR having the piston P connected thereto) in a state where each bolt 13 is screwed (fastened) in the female screw 11d' of the con-rod-side component 11 and the cap component 12 is fixed is held by the holding arm 142, each contact pin 151 comes into contact with the lower end portion of the bolt 13 to be pushed down while being guided by each guide hole 142c and the cantilever-like spring 152 undergoes a downward deflection to be elastically deformed in the screwing restriction mechanism 150.

Figure 10:
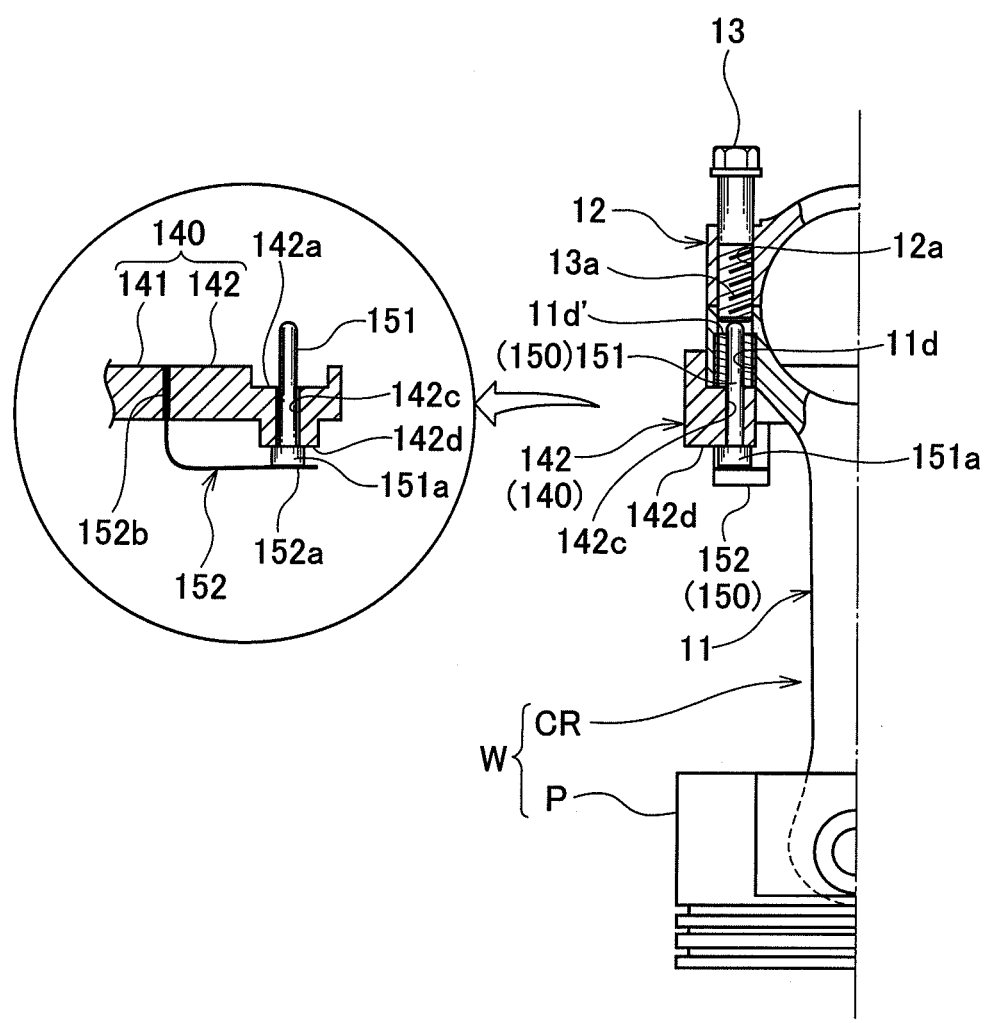
FIG. 10 is a partial cross-sectional view for explaining an operation of the screwing restriction mechanism depicted in FIG. 7.

On the other hand, as shown in FIG. 10, when the component assembly W (the connecting rod CR having the piston P connected thereto) in a state where each bolt 13 is unscrewed (loosened) from the female screw 11d' of the con-rod-side component 11 and held by the cap component 12 is held by the holding arm 142, each contact pin 151 is urged by urging force of the cantilever-like spring 152 and comes into contact with the lower end portion of each bolt 31 while being guided by each guide hole 142c and each flange portion 151a comes into contact with each end face 142d in the screwing restriction mechanism 150, and each bolt 13 is pushed up to a height at which the lower end portion of the bolt 13 is separated from the female screw 11d'.

Since the screw restriction mechanism 150 is provided in this manner, at the time that the component assembly W in which the cap component 12 (the assembling component) is assembled on the rod-side component 11 (the female screw component) and then each bolt 13 temporarily is assembled to the cap component 12 (the assembling component) from above without being screwed in the female screw 11d' is held by the holding arm 142 (the holding member 142) through the rod-side component 11 (the female screw component) and conveyed, even if each bolt 13 is unintentionally rotated to be screwed into the female screw 11d' under the influence of vibration and others due to conveyance, the screw restriction mechanism 150 restricts screwing of each bolt 13, whereby each bolt 13 is maintained in a state where it is unscrewed from the female screw 11d'.

Therefore, the component assembly W can be conveyed by using this conveyer device M1, the cap component 12 (the assembling component) can be readily separated from the rod-side component (the female screw component) in the cap component separating station M3 (the processing station) on the downstream side, and the assembling operation (predetermined processing) of the bearing BR can be performed with respect to the rod-side component 11 (the female screw component) and the cap component 12 (the assembling component).

In particular, since the contact pins 151 and the cantilever-like spring 152 are adopted as the screwing restriction mechanism 150, the construction can be simplified, the fixed end portion 152b of the cantilever-like spring 152 can be readily fixed to the holding member 140, and the cantilever-like spring 152 can be readily attached to a holding member of an existing conveyer device that does not include the screwing restriction mechanism 150.

As shown in FIG. 11 to FIG. 13, the grasping mechanism 160 includes an interlocking rod 161 that is inserted into the through hole 141a of the basal portion 141 (of the holding member 140) to allow its upward and downward movements, two grasping arms 162 that are interlocked by the interlocking rod 161 and can grasp the piston P as a connected component, a coil spring 163 that urges the interlocking rod 161 in such a manner that the grasping arms 162 grasp the piston P, an actuator 164 that moves the grasping arms 162 so as to release the piston P, and others.

As shown in FIG. 11 to FIG. 13, the interlocking rod 161 is inserted into the through hole 141a of the basal portion 141 so as to freely move upward and downward, and the interlocking rod includes a flange portion 161a that is placed above the basal portion 141 and receives the coil spring 163, two pins 161b placed below the basal portion 141, and others.

As shown in FIG. 11 to FIG. 13, the grasping arm 162 includes a spindle 162a that is rotatably supported with respect to the support portion 141b of the basal portion 141, one end portion 162b and the other end portion 162c placed on both sides to sandwich the spindle 162a, a U-shaped concave portion 162d formed at one end portion 162b to receive the pin 161b of the interlocking rod 161, a grasping piece 162e detachably connected to the other end portion 162c, a driven pin 162f provided between the spindle 162a and the other end portion 162c, and others.

As the grasping piece 162c, those having various shapes according to types of the piston P are prepared, and the grasping piece 162c can be replaced when removed from the other end portion 162c by loosening the bolt in accordance with a change in types of the connecting rod CR and the piston P.

As shown in FIG. 11 to FIG. 13, the coil spring 163 is arranged between the upper surface of the basal portion 141 and the flange portion 161a of the interlocking rod 161 in a compressed state and exercises the urging force so as to upwardly move the interlocking rod 161.

The actuator 164 is fixed to the upright frame 110 in the transferring station (not shown) where the component assembly W is transferred onto the holding member 140, and as shown in FIG. 12, the actuator includes a driving rod 164a that reciprocates in the vertical direction, substantially-L-like driving piece 164b that is fixed to the driving rod 164 and can come into contact with the driven pin 162f of the grasping arm 162, and others.

That is, in the grasping mechanism 160, as shown in FIG. 11 and FIG. 12, when the driving rod 164a of the actuator 164 protrudes and one driven pin 162f is pushed up by the driving piece 164b, the two grasping arms 162 interlock through the interlocking rod 161 and rotate against the urging force of the coil spring 163 in such a manner that the grasping pieces 164e move away from each other, thereby releasing the piston P from a grasped state.

It is to be noted that, when the two grasping arms 162 rotate to a predetermined releasing position, end faces 162b' of the end portions 162b of both arms come into contact with each other, whereby further rotation of the grasping arms is restricted.

On the other hand, in the grasping mechanism 160, when the driving rod 164a of the actuator 164 is retracted and the driving piece 164b is separated from the one driven pin 162f, as shown in FIG. 13, the interlocking rod 161 moves up due to the urging force of the coil spring 163, and then the two grasping arms 162 interlock through the interlocking rod 161 and rotate in such a manner that the grasping pieces 162e move closer to each other, thereby grasping the piston P from both sides.

It is to be noted that, when the two grasping arms 162 further rotate from the grasping position depicted in FIG. 13 without presence of the piston P, end faces 162b'' of the end portions 162b of both arms come into contact with each other, whereby further rotation of the grasping arms is restricted.

As described above, since the grasping mechanism 160 that grasps the piston P connected so as to be suspended while being held by the holding member 140 is provided, when conveying the component assembly W (the rod-side component 11, the piston P, the cap component 12) in which each bolt 13 is unscrewed from each female screw 11d', the grasping mechanism 160 can grasp the piston P to avoid its vibration or pendular oscillation, whereby screwing of each bolt 13 due to the vibration or oscillation of the piston P can be avoided even if the screwing restriction mechanism 150 cannot operate.

The bolt loosening station M2 includes a loosening mechanism (e.g., a tool detachably coupled with each bolt 13 from above and a servo motor that rotates the tool) that looses each bolt 13 of the component assembly W (the connecting rod CR having the piston P connected to the small-end portion 11a and having the cap component 12 fixed to the rod-side component 11 through the bolts 13).

Further, in the bolt loosening station M2, when the component assembly W is carried in by the conveyer device M1, the bolts 13 are unscrewed from the female screws 11d' of the rod-side component 11, and the bolts 13 are held in the insertion holes 12a of the cap component 12.

The cap component separating station M3 includes a separating mechanism (e.g., grasping arms that grasp the cap component 12, an inversion member that moves the grasping arms to turn the cap component 12 upside down, and a servo motor that drives the inversion member) that separates the cap component 12 holding the bolts 13 from the rod-side component 11 with respect to the component assembly W (the connecting rod CR that is in a state where the piston P is connected to the small-end portion 11a and the bolts 13 are unscrewed from the female screws 11d' to be held in the cap component 12) that has passed through the bolt loosening station M2.

Furthermore, in the cap component separating station M3, when the component assembly W is carried in by the conveyer device M1, the cap component 12 is separated to be turned upside down, and the cap component is transferred onto the component mount portion 144 of the holding member 140.

Next, processing operations in the automatic assembling line M including the conveyer device M1, the transferring station (not shown), the bolt loosening station M2, the cap component separating station M3, and the bearing assembling station (not shown) will be described.

First, in the transferring station, the component assembly W is transferred onto the holding member 140. In this transferring operation, the grasping mechanism 160 is operated to grasp and hold the piston P of the component assembly W from both sides so that the piston P cannot oscillate.

Subsequently, the component assembly W having the bolts 13 screwed (fastened) in the female screws 11d' of the con-rod-side component 11 to fix the cap component 12 is carried into the bolt loosening station M2 from the upstream side while being held by the holding arm 142 of the conveyer device M1.

At the time of conveyance, as shown in FIG. 9, the contact pins 151 come into contact with the lower end portions of the bolts 13 to be pushed down while being guided by the guide holes 142c, and the cantilever-like springs 152 undergo a downward deflection to be elastically deformed.

That is, when the component assembly W (the connecting rod CR having the piston P connected thereto) having the two bolts 13 being screwed in the female screws 11d' is conveyed, since the respective contact pins 151 are pushed down by the lower end portions of the bolts 13 against the urging forces of the respective cantilever-like springs 152, the component assembly W can be conveyed by the conveyer device M1 without problems.

Furthermore, when the component assembly W is carried into the bolt loosening station M2, the bolts 13 are loosened to be unscrewed from the female screws 11d', and the bolts 13 are held in the insertion holes 12a of the cap component 12.

As a result, as shown in FIG. 10, the contact pins 151 are urged by the urging forces of the cantilever-like springs 152 to come into contact with the lower end portions of the bolts 13 while being guided by the guide holes 142c, the flange portions 151a come into contact with the end faces 142d, and the bolts 13 are pushed up to a height at which the lower end portions of the bolts 13 are separated from the female screws 11d'.

That is, when the component assembly W (the connecting rod CR having the piston P connected thereto) having the two bolts 13 being unscrewed from the female screws female screws 11d' is conveyed, the respective contact pins 151 are upwardly urged by the cantilever-like springs 152, thereby preventing the respective bolts 13 from being again screwed into the female screws 11d.

Moreover, when the component assembly W is carried into the cap component separating station M3, the cap component 12 is separated from the rod-side component 11, turned upside down, and mounted onto the component mount portion 144 that is arranged to be adjacent to the holding arm 142.

Here, in a process that the component assembly W is conveyed from the bolt loosening station M2 to the cap component separating station M3 by the conveyer device M1, when the bolts 13 are unintentionally rotated to be screwed into the female screws 11d' under the influence of vibrations and others caused due to the conveyance, the screwing restriction mechanism 150 restricts the screwing of the bolts 13, whereby the bolts 13 are maintained in the state where screwing with respect to the female screws 11d is canceled.

Therefore, in the cap component separating station M3, the operation for separating the cap component 12 can be smoothly performed.

Thereafter, when the separated rod-side component 11 and the cap component 12 are carried into the bearing assembling station on the downstream side, the bearing BR is assembled with respect to the respective fitting surfaces 11g and 12d.

According to the conveyer device M1 having the above-described configuration, simplification of the construction, a reduction in size of the device, and others can be achieved, the unscrewed and temporarily assembled bolts 13 can be prevented from being unintentionally screwed into the female screws 11d' under the influence of vibration and others during conveyance when conveying the component assembly W including at least two components (the rod-side component 11, the cap component 12) that are to be fastened by using the bolts 13 and, in particular, the connecting rod CR having the piston P connected to the small-end portion 11a can be conveyed in the suspended state, the cap component 12 can be easily separated together with the bolts 13 from the rod-side component 11 in the cap component separating station M3 on the downstream side, and the semicircular bearing BR that supports a crankshaft can be smoothly attached to each of the rod-side component 11 and the cap component 12.

Figure 14A:
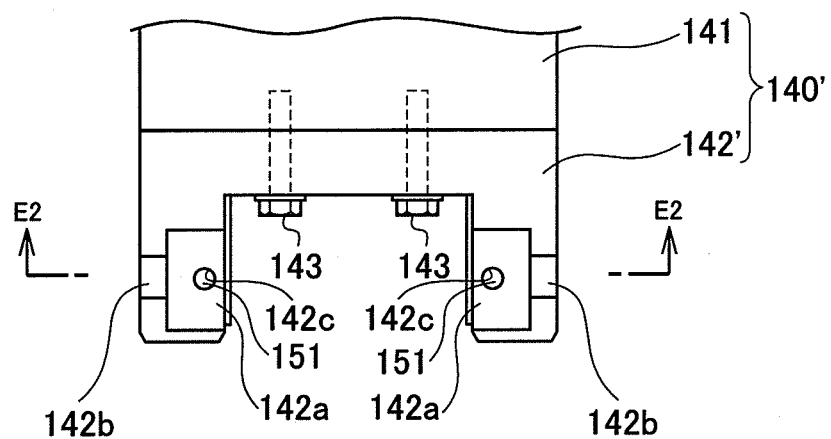
FIG. 14A is a partial plan view showing another embodiment of the screwing restriction mechanism included in the conveyer device according to the present invention.
Figure 14B:
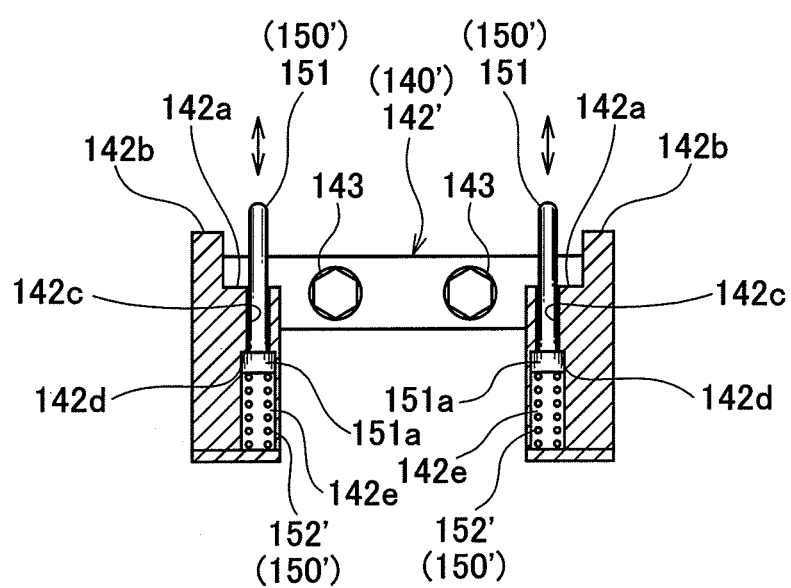
FIG. 14B is a cross-sectional view taken along a line E2-E2 in FIG. 14A.

FIG. 14A and FIG. 14B are partial cross-sectional views showing another embodiment of the screwing restriction mechanism included in the conveyer device M1 according to the present invention, and the same reference numerals are denoted to the same structures since they are equal to the structures in the foregoing embodiment except that the urging members (the cantilever-like springs 152) are changed and the holding arm 142 is changed, thereby omitting a description thereof.

That is, as shown in FIG. 14A and FIG. 14B, a screwing restriction mechanism 150' in this embodiment includes two contact pins 151 inserted into respective two guide holes 142c of a holding arm 142', two compression type coil springs 152' as a urging member that upwardly urge the contact pins 151, and others.

As shown in FIG. 14B, each of the two coil springs 152' is accommodated in a space portion 142e of the holding arm 142', holds the contact pin 151 at one end portion, has the other end portion held by the holding arm 142', and upwardly urges the contact pin 151.

According to this configuration, since the urging members are the coil springs 152, the coil springs 152' can be accommodated and held so as not to be exposed to the outside of the holding arm 142', whereby the construction can be smoothed so that various components cannot protrude around the holding arm 142'.

In this embodiment, likewise, when the component assembly W in which the cap component 12 (the assembling component) is assembled on a rod-side component 11 (a female screw component) and the bolts 13 are temporarily assembled to the cap component 12 (the assembling component) from above without being screwed in the female screws 11d' is held by the holding member 140 through the rod-side component 11 (the female screw component) and conveyed, even if the bolts 13 are unintentionally rotated to be screwed into female screws 11d' under the influence of vibration and others caused due to conveyance, the screwing restriction mechanism 150' restricts screwing of the bolts 13, thereby maintaining the bolts 13 in a state where the bolts are unscrewed from the female screws 11d'.

In the foregoing embodiments, as the screwing restriction mechanism, the screwing restriction mechanism 150 including the contact pins 151 and the cantilever-like springs 152 and the screwing restriction mechanism 150' including the contact pins 151 and the coil springs 152' have been described, but the present invention is not limited thereto, and any other configuration can be adopted as long as bolts can be prevented from being screwed into female screws.

In the foregoing embodiments, as the grasping mechanism that grasps a connected component, the grasping mechanism 160 including the interlocking rod 161, the two grasping arms 162, the coil spring 163, and the actuator 164 has been described, but the present invention is not limited thereto, and any other configuration can be adopted as long as the connected component that is held in the suspended state can be prevented from oscillating.

In the foregoing embodiments, the connecting rod CR having the piston P connected thereto has been described as the component assembly W that is conveyed by the conveyer device M1, and the rod-side component 11 and the cap component 12 have been described as the female screw component and the assembling component, respectively, but the present invention is not limited thereto, and a configuration in which bolts must be prevented from being unintentionally screwed into female screws can be applied to any other component assembly and any other female component and assembling component.

INDUSTRIAL APPLICABILITY

As described above, the conveyer device according to the present invention can achieve simplification of the construction, a reduction in size of the device, and others and can prevent the unscrewed and temporarily assembled bolts from being unintentionally screwed into the female screws under the influence of vibration and others during conveyance when conveying the component assembly including at least two components that are fastened by using the bolts. Therefore, the present invention can be of course applied to an automatic assembling line for an engine and others and is useful in fields for producing other mechanical components, electric components, electronic components, and others.

The invention claimed is:

1. A conveyor device for conveying a component assembly that includes a female screw component having a through hole defining a female screw, an assembling component to be assembled to the female screw component from above, and a bolt to be screwed into the female screw of the female screw component from above the assembling component to enable fixing the assembling component to the female screw component, the conveyor device comprising:

a holding member for holding the female screw component; and a screw restriction mechanism connected to the holding member to restrict movement of the bolt held by the assembling component in a state where the bolt is unscrewed from the female screw so as not to be screwed into the female screw, the screw restriction mechanism including a contact pin that is inserted into the through hole from below the female screw component and comes into contact with a lower end portion of the bolt, and an urging member that is connected to the holding member so as to upwardly urge the contact pin.

2. The conveyer device according to claim 1, wherein the female screw component has a connected component that is connected thereto in a state where the female screw component is suspended from the holding member, the holding member further comprising a grasping mechanism for grasping the connected component.

3. The conveyer device according to claim 1, wherein the holding member has a guide hole into which the contact pin is inserted, and the urging member is a cantilever-like spring that holds the contact pin in the guide hole at a free end portion thereof and has a fixed end portion fixed to the holding member.

4. The conveyer device according to claim 1, wherein the holding member has a guide hole into which the contact pin is inserted, and the urging member is a compression type coil spring that holds the contact pin in the guide hole at one end portion thereof and has an other end portion held by the holding member.

5. The conveyer device according to claim 1, wherein the female screw component is a rod-side component including a small-end portion, a rod portion, and a half-large-end portion that defines a half of a large-end portion of a connecting rod used for an internal-combustion engine, the assembling component is a cap component to be assembled to the rod-side component by using two bolts so as to define an other half of the large-end portion, and the holding member includes a holding arm for holding the rod-side component.

6. The conveyer device according to claim 5, wherein the screw restriction mechanism includes two contact pins that are respectively inserted into two through holes of the rod-side component from below and respectively come into contact with lower end portions of the two bolts, and urging members that are connected to the holding member to upwardly urge the two contact pins, respectively, the holding arm has two guide holes into which the two contact pins are inserted, respectively, and each of the urging members is a cantilever-like spring that is arranged below the holding arm, holds each of the two contact pins inserted in the guide holes at a free end portion thereof, and has a fixed end portion fixed to the holding member.

7. The conveyer device according to claim 5, wherein the holding member includes a component mount portion that is formed to be adjacent to the holding arm in order to hold the assembling component separated from the female screw component.

8. The conveyer device according to claim 6, wherein the holding member includes a component mount portion that is formed to be adjacent to the holding arm in order to hold the assembling component when separated from the female screw component.

* * * * *